US011761326B2

(12) United States Patent
Chanpura et al.

(10) Patent No.: US 11,761,326 B2
(45) Date of Patent: Sep. 19, 2023

(54) AUTOMATED SCHEDULING OF SENSORS FOR DIRECTIONAL DRILLING

(71) Applicant: Halliburton Energy Services, Inc., Houston, TX (US)

(72) Inventors: Reena Agarwal Chanpura, Sugarland, TX (US); Umut Zalluhoglu, Humble, TX (US); Cristian Sosareyes, Stafford, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/880,029

(22) Filed: May 21, 2020

(65) Prior Publication Data
US 2021/0363875 A1    Nov. 25, 2021

(51) Int. Cl.
*E21B 47/024* (2006.01)
*G05B 11/01* (2006.01)
(Continued)

(52) U.S. Cl.
CPC .............. *E21B 47/024* (2013.01); *E21B 7/04* (2013.01); *E21B 47/12* (2013.01); *E21B 47/26* (2020.05); *G05B 11/011* (2013.01); *E21B 44/00* (2013.01)

(58) Field of Classification Search
CPC .......... E21B 47/00; E21B 7/04; E21B 47/024; E21B 47/26; E21B 47/12; E21B 44/00;
(Continued)

(56) References Cited

U.S. PATENT DOCUMENTS

| 7,394,257 B2* | 7/2008 | Martinez | G01V 11/002 324/369 |
| 8,788,210 B2* | 7/2014 | Ramshaw | E21B 47/00 702/12 |

(Continued)

FOREIGN PATENT DOCUMENTS

| CA | 2967324 | * | 3/2019 | ............. E21B 44/00 |
| CN | 109779604 | * | 5/2019 | ............. E21B 21/003 |
| WO | WO-2018142173 A1 | * | 8/2018 | ............. E21B 44/00 |

OTHER PUBLICATIONS

Lowdon, R., Sugiura, J., & Bowler, A. (2013). Novel Survey Method Using a Rotary Steerable System Significantly Improves the Dynamic Inclination and Azimuth Measurement. SPE Offshore Europe Oil and Gas Conference and Exhibition.
(Continued)

*Primary Examiner* — Michael J Dalbo
*Assistant Examiner* — Kaleria Knox
(74) *Attorney, Agent, or Firm* — Benjamin Ford; C. Tumey Law Group PLLC

(57) ABSTRACT

A method and system for a rotary steerable system (RSS). The method may comprise performing a tool position calculation from the one or more measurements and creating one or more event flags based at least in part on a location of the RSS in a formation, wherein the one or more event flags are created by an information handling system disposed on a bottom hole assembly. The method may also comprise selecting an algorithm for the tool position calculation based on the one or more event flags. The system may comprise one or more sensors configured to take one or more measurements and an information handling system disposed on a bottom hole assembly.

20 Claims, 4 Drawing Sheets

(51) Int. Cl.
*E21B 7/04* (2006.01)
*E21B 47/26* (2012.01)
*E21B 47/12* (2012.01)
*E21B 44/00* (2006.01)

(58) Field of Classification Search
CPC ......... E21B 7/10; E21B 49/10; G05B 11/011; B07B 1/46; G01V 11/002
See application file for complete search history.

(56) References Cited

U.S. PATENT DOCUMENTS

| | | | |
|---|---|---|---|
| 2004/0040746 A1 | 3/2004 | Niedermayr et al. | |
| 2005/0132794 A1 | 6/2005 | Spross et al. | |
| 2009/0316528 A1* | 12/2009 | Ramshaw | E21B 47/00 367/83 |
| 2010/0206063 A1* | 8/2010 | Fujisawa | E21B 49/10 73/152.24 |
| 2014/0163888 A1* | 6/2014 | Bowler | E21B 47/022 703/2 |
| 2015/0167392 A1* | 6/2015 | Sugiura | E21B 7/04 175/45 |
| 2019/0113648 A1 | 4/2019 | Wu et al. | |
| 2019/0345771 A1* | 11/2019 | Zalluhoglu | E21B 7/10 |
| 2020/0011167 A1 | 1/2020 | Zhao et al. | |
| 2020/0040720 A1 | 2/2020 | Zalluhoglu et al. | |
| 2020/0072034 A1 | 3/2020 | Zalluhoglu et al. | |
| 2020/0095849 A1 | 3/2020 | Demirer et al. | |
| 2020/0095860 A1 | 3/2020 | Zalluhoglu et al. | |
| 2020/0284145 A1* | 9/2020 | ElGamal | B07B 1/46 |

OTHER PUBLICATIONS

AutoTrak rotary steerable systems, Baker Huges, 2018.
PowerDrive Orbit, Rotary steerabel System, Schlumberger, 2017.
Geo-Pilot® Duro™, Rotary Steerable System, H012383, Jul. 2019.
International Search Report and Written Opinion for Application No. PCT/US2020/035313, dated Feb. 2, 2021.

* cited by examiner

AUTOMATED SCHEDULING OF SENSORS FOR DIRECTIONAL DRILLING

BACKGROUND

In order to obtain hydrocarbons such as oil and gas, boreholes are drilled through hydrocarbon-bearing subsurface formations. During drilling operations, directionally drilling operations may by performed where the drilling direction may veer of an intended drilling path at an angle or even horizontally away from the drilling path. Directional drilling of a subterranean well and, in particular, controlling the angle and direction of drilling through selectable bending of a shaft is controlled by a steering sub connected to the drill bit. Due to the extreme environment experienced by directional drilling equipment, failure of machinery during drilling operations may be possible.

Currently, if a failure appears within the machinery, or the drilling path is outside of a pre-designated path, personnel may be notified of the failure. However, current technology only identifies that there is a failure. Interpretation of the failure depends heavily on driller's knowledge of field operations, drilling tools and data interpretation. The driller has to evaluate surface data, key performance indices for the service, and pulsed up real-time data from downhole tools to make quick and accurate decisions at the rig.

BRIEF DESCRIPTION OF THE DRAWINGS

These drawings illustrate certain aspects of some examples of the present disclosure and should not be used to limit or define the disclosure.

DETAILED DESCRIPTION

Described below are methods and systems for real-time health assessment of a rotary steerable system ("RSS"). The proposed systems and methods include an intelligent and interactive real-time fault diagnosis and decision support system for rotary steerable system. Specifically, the failure of one or more sensors or the degradation of measurements form the one or more sensors during drilling operations. Event flags may be produced from perceived failure of one or more sensors or the degradation of measurements due to environmental effects. These event flags may be sent to personnel for review. However, the event flags do not present solutions or automatically address the issue. As discussed below, methods and system may present solutions for personnel to choose from and follow. Additionally, methods and systems may automatically address the event flags and alter drilling operations or the RSS to address the event flags.

With the increased complexity and added functionality of RSS to improve drilling performance, enabling automated drilling and reduce cost of ownership, personnel may have multiple options for sensors. This increases the occurrence of sub optimal sensor selection due to lack of understanding of the coupling between different feedback sensors and sensor robustness to different events. The method aims to address these gaps and provide systematic feedback sensor selection methods that may be automated with surface systems or downhole tool for accurate well placement for wider operating envelope and design of service.

Figure 1:
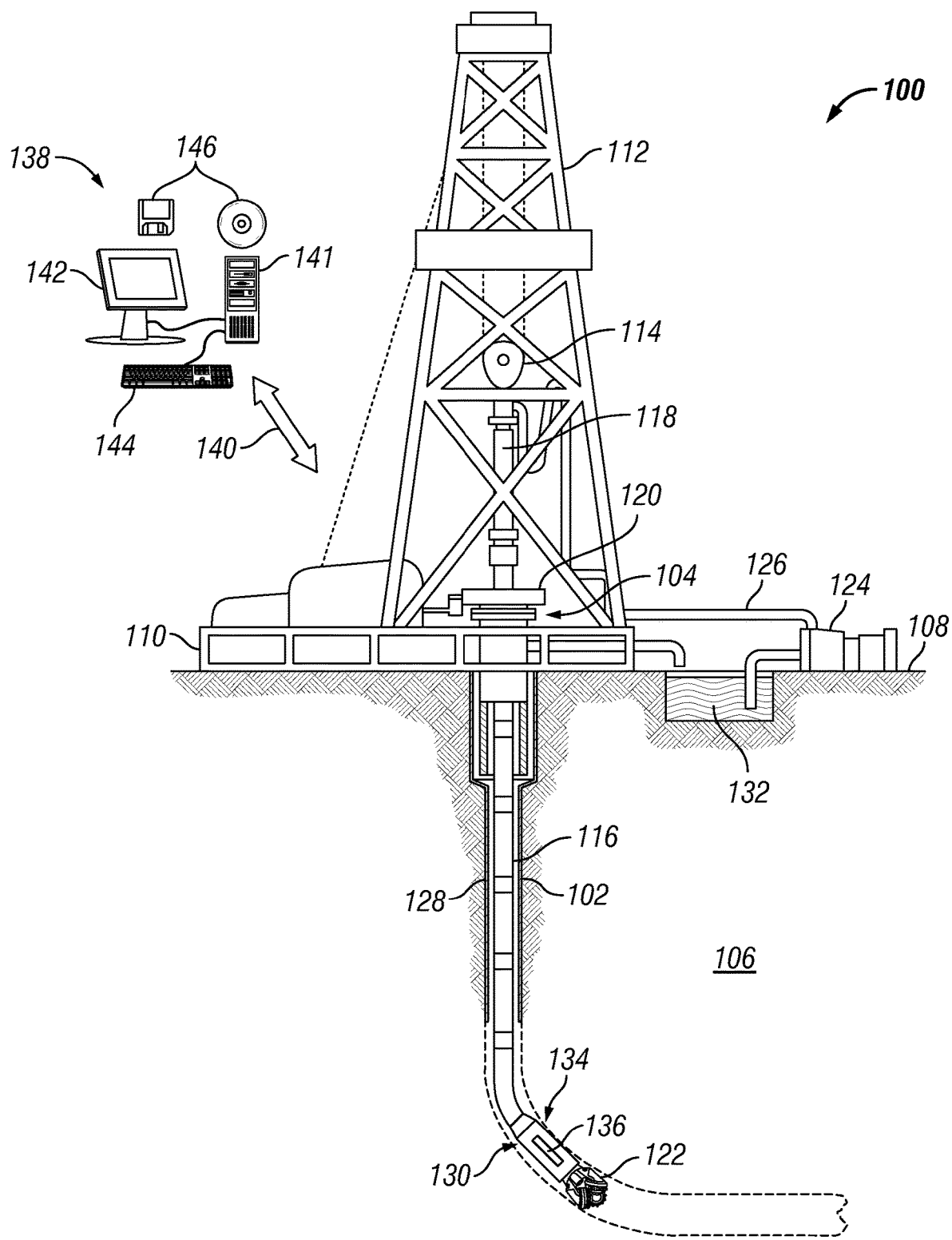
FIG. 1 illustrate an example of a drilling system.

FIG. 1 illustrates a drilling system 100 in accordance with example embodiments. As illustrated, borehole 102 may extend from a wellhead 104 into a subterranean formation 106 from a surface 108. Generally, borehole 102 may include horizontal, vertical, slanted, curved, and other types of borehole geometries and orientations. Borehole 102 may be cased or uncased. In examples, borehole 102 may include a metallic member. By way of example, the metallic member may be a casing, liner, tubing, or other elongated steel tubular disposed in borehole 102.

As illustrated, borehole 102 may extend through subterranean formation 106. As illustrated in FIG. 1, borehole 102 may extend generally vertically into the subterranean formation 106, however borehole 102 may extend at an angle through subterranean formation 106, such as horizontal and slanted boreholes. For example, although FIG. 1 illustrates a vertical or low inclination angle well, high inclination angle or horizontal placement of the well and equipment may be possible. It should further be noted that while FIG. 1 generally depict land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend borehole 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse borehole 102. Drill bit 122 may be attached to a distal end of drill string 116 and may be driven, for example, either by a downhole motor and/or via rotation of drill string 116 from surface 108. Drill bit 122 may be a part of a rotary steerable system (RSS) 130 at distal end of drill string 116. RSS 130 may further include tools for real-time health assessment of a rotary steerable tool during drilling operations. As will be appreciated by those of ordinary skill in the art, RSS 130 may be a measurement-while drilling (MWD) or logging-while-drilling (LWD) system.

RSS 130 may comprise any number of tools, such as sensors, transmitters, and/or receivers to perform downhole measurement operations or to perform real-time health assessment of a rotary steerable tool during drilling operations. For example, as illustrated in FIG. 1, RSS 130 may include a bottom hole assembly (BHA) 134. It should be noted that BHA 134 may make up at least a part of RSS 130. Without limitation, any number of different measurement assemblies, communication assemblies, battery assemblies, and/or the like may form RSS 130 with BHA 134. Additionally, BHA 134 may form RSS 130 itself. In examples, BHA 134 may comprise one or more sensors 136. Sensors 136 may be connected to information handling system 138, discussed below, which may further control the operation of sensors 136. Sensors 136 may include accelerometers, gyroscopes, magnetometers, strain gauges, gamma ray detectors, and/or the like. Additionally, sensors 136 may be bundled in a sensor packet, not illustrated. There may be any number of sensor packets disposed in BHA 134 or RSS 130 in difference locations. Furthermore, there may be any number of sensors disposed in BHAD 134 or RSS 130. During operations, sensors 136 may process real time data originating from various sources such as diagnostics data, sensors measurements, operational data, and/or the like. Information and/or measurements may be processed further by information handling system 138 to determine real time heal assessment of rotary steerable tool.

Without limitation, RSS 130 may be connected to and/or controlled by information handling system 138, which may be disposed on surface 108. Without limitation, information handling system 138 may be disposed downhole in RSS 130. Processing of information recorded may occur downhole and/or on surface 108. Processing occurring downhole may be transmitted to surface 108 to be recorded, observed, and/or further analyzed. Additionally, information recorded on information handling system 138 that may be disposed downhole may be stored until RSS 130 may be brought to surface 108. In examples, information handling system 138 may communicate with RSS 130 through a communication line (not illustrated) disposed in (or on) drill string 116. In examples, wireless communication may be used to transmit information back and forth between information handling system 138 and RSS 130. Information handling system 138 may transmit information to RSS 130 and may receive as well as process information recorded by RSS 130. In examples, a downhole information handling system (not illustrated) may include, without limitation, a microprocessor or other suitable circuitry, for estimating, receiving, and processing signals from RSS 130. Downhole information handling system (not illustrated) may further include additional components, such as memory, input/output devices, interfaces, and the like. In examples, while not illustrated, RSS 130 may include one or more additional components, such as analog-to-digital converter, filter, and amplifier, among others, that may be used to process the measurements of RSS 130 before they may be transmitted to surface 108. Alternatively, raw measurements from RSS 130 may be transmitted to surface 108.

Any suitable technique may be used for transmitting signals from RSS 130 to surface 108, including, but not limited to, wired pipe telemetry, mud-pulse telemetry, acoustic telemetry, and electromagnetic telemetry. While not illustrated, RSS 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from RSS 130 to an information handling system 138 at surface 108. Information handling system 138 may include a personal computer 141, a video display 142, a keyboard 144 (i.e., other input devices.), and/or non-transitory computer-readable media 146 (e.g., optical disks, magnetic disks) that can store code representative of the methods described herein. In addition to, or in place of processing at surface 108, processing may occur downhole as information handling system 138 may be disposed on RSS 130. Likewise, information handling system 138 may process measurements taken by one or more sensors 136 automatically or send information from sensors 136 to the surface. As discussed above, the software, algorithms, and modeling is performed by information handling system 138. Information handling system 138 may perform steps, run software, perform calculations, and/or the like automatically, through automation (such as through artificial intelligence ("AI"), dynamically, in real-time, and/or substantially in real-time.

Figure 2:
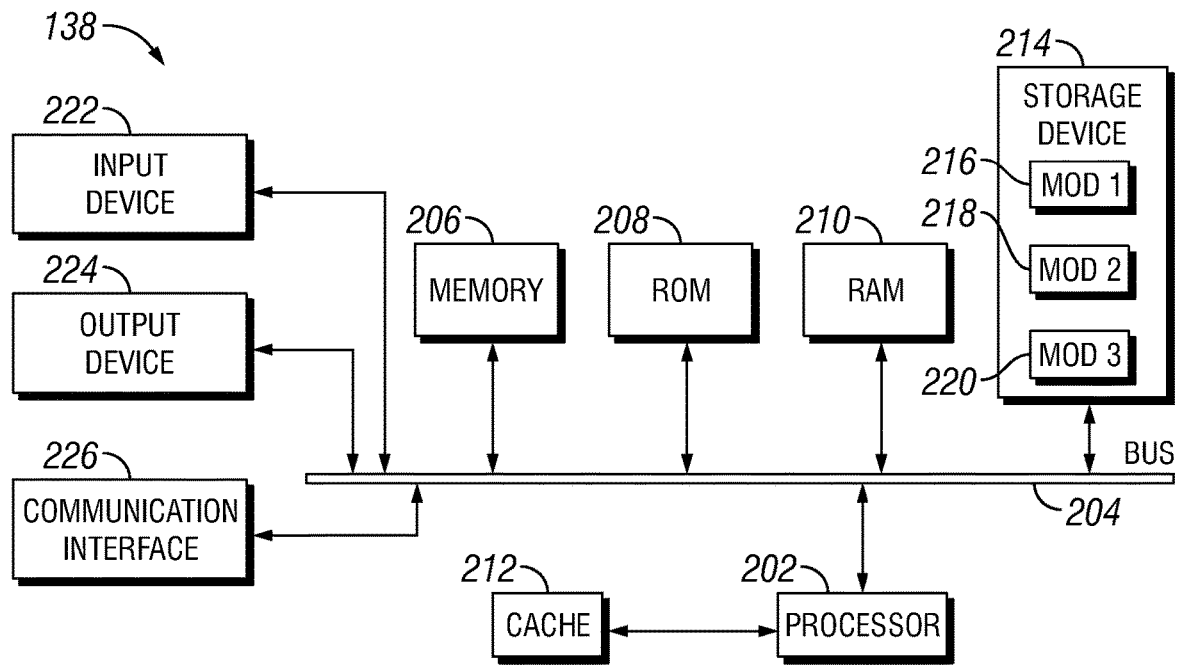
FIG. 2 is a schematic view of an information handling system.

FIG. 2 illustrates an example information handling system 138 which may be employed to perform various steps, methods, and techniques disclosed herein. Persons of ordinary skill in the art will readily appreciate that other system examples are possible. As illustrated, information handling system 138 includes a processing unit (CPU or processor) 202 and a system bus 204 that couples various system components including system memory 206 such as read only memory (ROM) 208 and random access memory (RAM) 210 to processor 202. Processors disclosed herein may all be forms of this processor 202. Information handling system 138 may include a cache 212 of high-speed memory connected directly with, in close proximity to, or integrated as part of processor 202. Information handling system 138 copies data from memory 206 and/or storage device 214 to cache 212 for quick access by processor 202. In this way, cache 212 provides a performance boost that avoids processor 202 delays while waiting for data. These and other modules may control or be configured to control processor 202 to perform various operations or actions. Other system memory 206 may be available for use as well. Memory 206 may include multiple different types of memory with different performance characteristics. It may be appreciated that the disclosure may operate on information handling system 138 with more than one processor 202 or on a group or cluster of computing devices networked together to provide greater processing capability. Processor 202 may include any general purpose processor and a hardware module or software module, such as first module 216, second module 218, and third module 220 stored in storage device 214, configured to control processor 202 as well as a special-purpose processor where software instructions are incorporated into processor 202. Processor 202 may be a self-contained computing system, containing multiple cores or processors, a bus, memory controller, cache, etc. A multi-core processor may be symmetric or asymmetric. Processor 202 may include multiple processors, such as a system having multiple, physically separate processors in different sockets, or a system having multiple processor cores on a single physical chip. Similarly, processor 202 may include multiple distributed processors located in multiple separate computing devices, but working together such as via a communications network. Multiple processors or processor cores may share resources such as memory 206 or cache 212, or may operate using independent resources. Processor 202 may include one or more state machines, an application specific integrated circuit (ASIC), or a programmable gate array (PGA) including a field PGA (FPGA).

Each individual component discussed above may be coupled to system bus 204, which may connect each and every individual component to each other. System bus 204 may be any of several types of bus structures including a memory bus or memory controller, a peripheral bus, and a local bus using any of a variety of bus architectures. A basic input/output (BIOS) stored in ROM 208 or the like, may provide the basic routine that helps to transfer information between elements within information handling system 138, such as during start-up. Information handling system 138 further includes storage devices 214 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 214 may include software modules 216, 218, and 220 for controlling processor 202. Information handling system 138 may include other hardware or software modules. Storage device 214 is connected to the system bus 204 by a drive interface. The drives and the associated computer-readable storage devices provide nonvolatile storage of computer-readable instructions, data structures, program modules and other data for information handling system 138. In one aspect, a hardware module that performs a particular function includes the software component stored in a tangible computer-readable storage device in connection with the necessary hardware components, such as processor 202, system bus 204, and so forth, to carry out a particular function. In another aspect, the system may use a processor and computer-readable storage device to store instructions which, when executed by the processor, cause the processor to perform operations, a method, or other specific actions. The basic components and appropriate variations may be modified depending on the type of device, such as whether information handling system 138 is a small, handheld computing device, a desktop computer, or a computer server. When processor 202 executes instructions to perform "operations", processor 202 may perform the operations directly and/or facilitate, direct, or cooperate with another device or component to perform the operations.

As illustrated, information handling system 138 employs storage device 214, which may be a hard disk or other types of computer-readable storage devices which may store data that are accessible by a computer, such as magnetic cassettes, flash memory cards, digital versatile disks (DVDs), cartridges, random access memories (RAMs) 210, read only memory (ROM) 208, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 138, an input device 222 represents any number of input mechanisms, such as a microphone for speech, a touch-sensitive screen for gesture or graphical input, keyboard, mouse, motion input, speech and so forth. Additionally, input device 222 may take in data from one or more sensors 136, discussed above. An output device 224 may also be one or more of a number of output mechanisms known to those of skill in the art. In some instances, multimodal systems enable a user to provide multiple types of input to communicate with information handling system 138. Communications interface 226 generally governs and manages the user input and system output. There is no restriction on operating on any particular hardware arrangement and therefore the basic hardware depicted may easily be substituted for improved hardware or firmware arrangements as they are developed.

As illustrated, each individual component describe above is depicted and disclosed as individual functional blocks. The functions these blocks represent may be provided through the use of either shared or dedicated hardware, including, but not limited to, hardware capable of executing software and hardware, such as a processor 202, that is purpose-built to operate as an equivalent to software executing on a general purpose processor. For example, the functions of one or more processors presented in FIG. 2 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 208 for storing software performing the operations described below, and random access memory (RAM) 210 for storing results. Very large scale integration (VLSI) hardware embodiments, as well as custom VLSI circuitry in combination with a general purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 138 may practice all or part of the recited methods, may be a part of the recited systems, and/or may operate according to instructions in the recited tangible computer-readable storage devices. Such logical operations may be implemented as modules configured to control processor 202 to perform particular functions according to the programming of software modules 216, 218, and 220.

Figure 3:
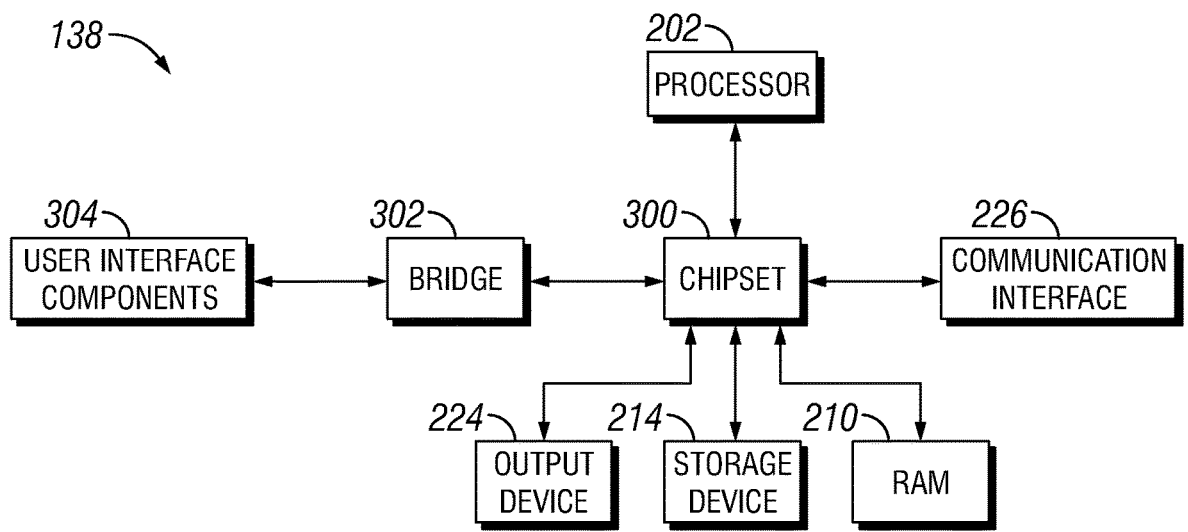
FIG. 3 is another schematic view of the information handling system.

In examples, one or more parts of the example information handling system 138, up to and including the entire information handling system 138, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization compute layer may operate on top of a physical compute layer. The virtualization compute layer may include one or more virtual machines, an overlay network, a hypervisor, virtual switching, and any other virtualization application FIG. 3 illustrates an example information handling system 138 having a chipset architecture that may be used in executing the described method and generating and displaying a graphical user interface (GUI). Information handling system 138 is an example of computer hardware, software, and firmware that may be used to implement the disclosed technology. Information handling system 138 may include a processor 202, representative of any number of physically and/or logically distinct resources capable of executing software, firmware, and hardware configured to perform identified computations. Processor 202 may communicate with a chipset 300 that may control input to and output from processor 202. In this example, chipset 300 outputs information to output device 224, such as a display, and may read and write information to storage device 214, which may include, for example, magnetic media, and solid state media. Chipset 300 may also read data from and write data to RAM 210. A bridge 302 for interfacing with a variety of user interface components 304 may be provided for interfacing with chipset 300. Such user interface components 304 may include a keyboard, a microphone, touch detection and processing circuitry, a pointing device, such as a mouse, and so on. In general, inputs to information handling system 138 may come from any of a variety of sources, machine generated and/or human generated.

Chipset 300 may also interface with one or more communication interfaces 226 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 202 analyzing data stored in storage device 214 or RAM 210. Further, information handling system 138 receive inputs from a user via user interface components 304 and execute appropriate functions, such as browsing functions by interpreting these inputs using processor 202.

In examples, information handling system 138 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices During drilling operations information handling system 138 may process different types of the real time data originated from varied sampling rates and various sources, such as diagnostics data, sensor measurements, operations data, and or the like through one or more sensors 136 disposed at any suitable location within and/or on RSS 130. (e.g., referring to FIG. 1). These measurements from one or more sensors 136 may allow for information handling system 138 to perform real-time assessments of sensors 136.

An assessment of sensors 136 may be performed by processing events that may affect feedback measurement quality of each sensor 136. For example, selection of feedback sources such as a tool face source, an inclination source, or an azimuth source is performed based on operating conditions to optimize manual and automated drilling performance. Methods discussed below maps events that effect feedback measurement quality to feedback source selection. It also enables the events detection for changing feedback source selection appropriately, thus providing a reliable method to optimize steering performance and reduce non-productive time.

In examples, RSS 130 may include on board automatic controllers to steer RSS 130, which may control the creation of borehole 102 to a desired direction. Automated controllers may include valve position controllers to hold a desired toolface, cruise controllers to hold a desired direction that may be defined by at least an inclination or azimuth angle. During drilling operations, automated controllers require real-time measurement feedback to perform controlled drilling operations. Among many real-time measurements from sensors 136 (e.g., referring to FIG. 1) that are used as feedback for automatic controllers may be tool position calculations. Tool position calculations may include toolface calculations, inclination calculations, and azimuth calculations.

The calculations of toolface, inclination and azimuth are found from one or more raw measurements from one or more sensors 136 such as accelerometers, magnetometers and gyros placed along RSS 130. These calculation methods (equations/algorithms to calculate toolface, inclination and azimuth) have different sensitivities to drilling conditions (drilling location on earth, drilling direction, drilled formation, proximity to materials that may be magnetized such as casing etc.). Thus, different calculations methods may be used to determine toolface, inclination, or azimuth.

For example, toolface calculations may be performed by magnetometers, accelerometers, and/or gyro. A first toolface calculations may be performed by measurements that primarily utilize magnetometers. This may provide accurate toolface measurements for steering control a low inclination and outside zones of exclusion. A second tool face calculation may be performed combining measurements from magnetometers and accelerometers. This may provide accurate toolface measurements for steering control at high inclinations and outside zones of exclusion. Use of magnetometers makes the method robust against vibrations that negatively impact accelerometer measurements. A third toolface calculation may be performed combining measurements from gyros and accelerometers. This may provide accurate toolface measurements for steering control at high inclinations. However, it may be susceptible to error under vibration, but may be robust inside a zone of exclusion. These three calculations are only examples, as other types of measurements and combination of measurements may be used for toolface calculations.

Inclination calculations may be performed with accelerometers and/or magnetometers. For example, a first inclination calculation may use a combination of accelerometers and magnetometers. This may allow for measurements to be sensitive to noise at high inclinations but may stay roust at low inclinations. A second inclination calculation may use accelerometers. This may allow for measurements sensitive to noise at low inclinations, but may be robust at high inclinations.

Azimuth calculations may be performed with accelerometers and/or magnetometers. For example, a first azimuth calculation may use a combination of accelerometers and magnetometers. This may allow for measurements to be robust at low inclination at all azimuthal directions. A second azimuth calculation may use a combination of accelerometers and magnetometers. This may provide robust measurements at medium-high inclinations and azimuthal directions along a North and/or South direction. A third azimuth calculation may use a combination of accelerometers and magnetometers. This may provide a robust measurement at medium-high inclinations and azimuthal directions along East and/or West directions.

In order to ensure that toolface, inclination and azimuth calculations are reliable across all potential drilling conditions, sensor 136 (based on type, range, distance from bit, algorithms, and availability) that take measurements for these calculations may be assessed to determine if one or more sensors 136 and the measurements provided are reliable.

Figure 4:
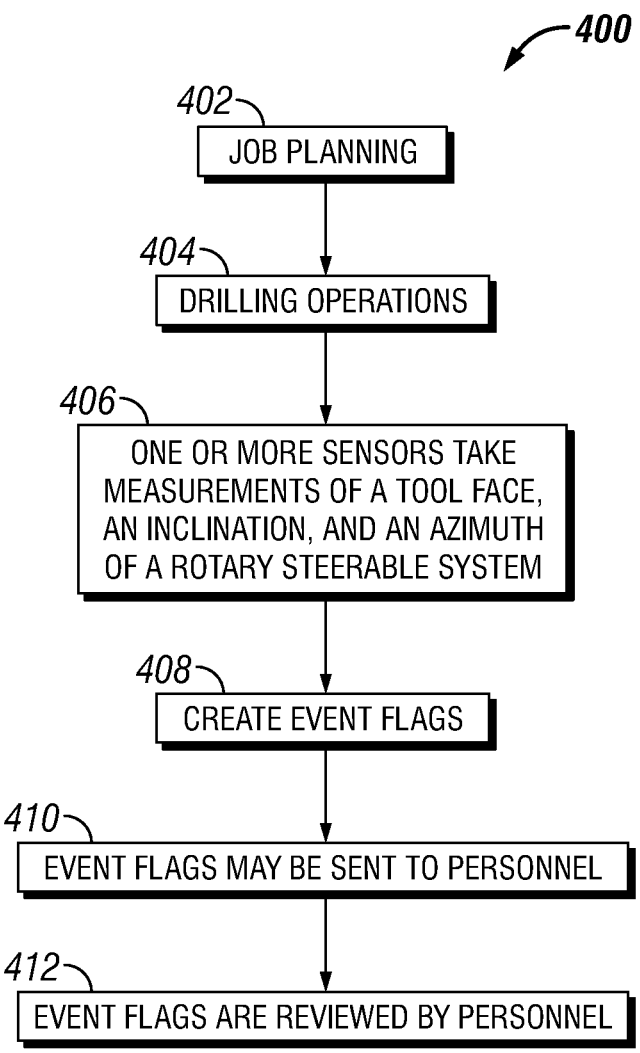
FIG. 4 is a flow chart for identifying possible faulty sensors or degraded measurements with one or more sensors.

FIG. 4 illustrates workflow 400 for selection of sensors 136. As discussed above, during drilling operation, measurement from one or more sensors 136 may be unreliable due to the environment in which drilling operations may be taking place. Workflow 400 may be utilized to determine which sensors 136, and measurements from selected sensors 136, may be reliable. As illustrated in FIG. 4, workflow 400 may begin with block 402. In block 402, job planning for drilling operations is performed. During job planning, decision trees for algorithms, thresholds, or possible events experienced during drilling operations may be identified and programed into information handling system 138. In examples, job planning may be continuously updated during drilling operations in block 404.

In block 404, drilling operations may begin. During drilling operation BHA 134 may utilize one or more sensors 136 to perform measurements of formation properties, borehole properties, and/or the functionality of BHA 134. In block 406, one or more sensors 136 are utilized to make measurements of a tool face, an inclination, and an azimuth of RSS 130. However, the measurements may be degraded based on environmental conditions and/or mechanical factors. For example, for a rotating RSS 130, sensors 136, such as accelerometers and magnetometers that may be disposed on BHA 134 may take measurements that oscillate with a frequency that matches the revolutions-per-minute (PRM) of RSS 130. The algorithms that use the sensory measurements from accelerometers, magnetometers and gyros usually consist of trigonometric functions, which may have different sensitivities to events such as environmental conditions and/or mechanical factors.

Figure 5A:
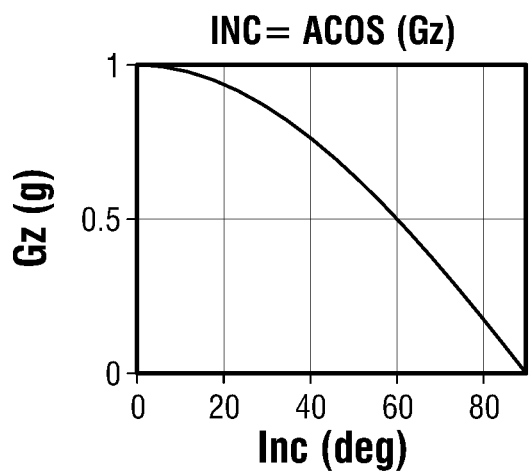
FIGS. 5A-6B illustrates inclination angle of the one or more sensors and the sensitivity of the one or more sensors in the inclination angle.
Figure 6A:
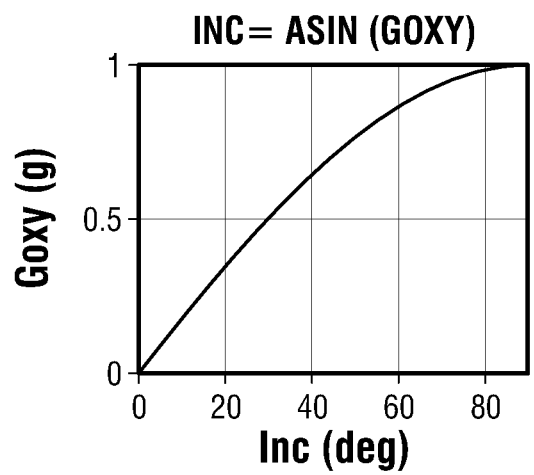
Figure 5B:
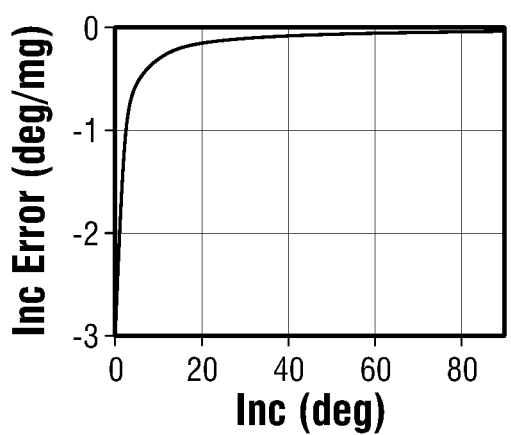
Figure 6B:
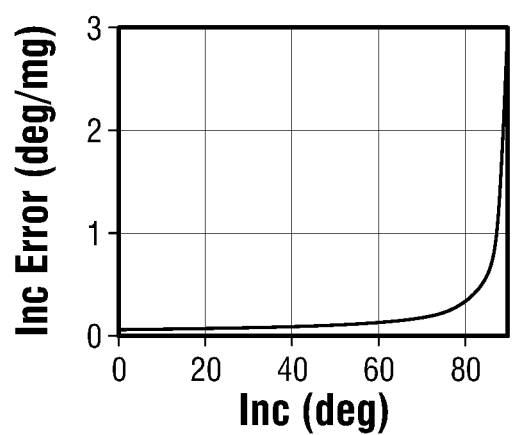

FIG. 5A illustrates an inclination calculations of sensors 136 in a z direction and the sensitivity of sensors 136 in the z direction are illustrated in FIG. 5B. FIG. 6A illustrates an inclination calculations of sensors 136 in a x and y direction and the sensitivity of sensors 136 in the x and 7 direction are illustrated in FIG. 6B. FIGS. 5A-6B are examples of various algorithms that may be used to calculate inclination, which may use at least one of the following sensors 136: accelerometer, magnetometer and gyro. FIGS. 5A-6B illustrated different methods that may have different sensitivities in different conditions (in this case inclination)

Referring back to FIG. 4, in block 408 event flags are created based at least in part on the loss of sensitivity or degrading of measurements from one or more sensors 136. In block 408, the decision trees for algorithms, the thresholds, or the possible events experienced during drilling planned in block 402 are compared to the measurements from block 406. For example, utilizing a decision tree may operate by taking measurements from one or more sensors 136 based at last in part in an identified drilling zone. A drilling zone may be identified as a specific depth or range of depth. These depths may relate to different characteristics of within a formation 106. Thus, measurements may only be taken sensors 136 that may not be affected by specific drilling conditions, such as drilling location on earth, drilling direction, drilled formation, proximity to materials that may be magnetized such as casing etc.

Another method outside of a decision tree may be weighted averaging of multiple algorithms. Where weights vary as a function of inclination, azimuth, measured vibration levels on accelerometers, and detected magnetic interference by magnetometers. Additionally, one or more sensors 136 may be disposed on BHA 134 at any suitable location, which may allow for sensor source scheduling. In examples, sensors 136 placed closer to drill bit 122 experience higher levels of vibrations, thus tend to be less precise than sensors 136 place further behind further away from drill bit 122. Under harsh drilling conditions with high vibration levels, the inputs to the algorithms may be switched from near-bit sensors to sensors further away from drill bit 122. In examples, choosing sensors 136 may be performed manually and/or automatically by information handling system 138 disposed at the surface or on BHA 134. In order to facilitate accurate well placement and reduce processing time over wider operational range, every sensor source (sensor type, range, distance from the bit) may controlled by a centralized processor within information handling system 138. and all algorithms per sensor source for optimal feedback source selection.

With continued reference to block 408, events that influence the selection of individual sensors 136 may include high vibrations, which may deteriorate accelerometer readings due to reduced signal-to-noise ratio ("SNR"). For examples, at low inclinations of BHA 134 the magnitude of measurements by the accelerometer in an x and y direction may be low, thus SNR may reduce significantly for measurements in the x and y direction under vibrations. However, at high inclination of BHA 134, magnitude of measurements in the z direction may be unreliable for the state reasons above. Additionally, another event to consider is the saturation of accelerometer measurements due to high levels of vibration. If the vibration amplitude increases over a threshold that matches the maximum dynamic range of the accelerometer, the signal of interest cannot be precisely recovered even after filtering. As accelerometer measurements may be used for inclination, azimuth, or toolface calculations, the saturation of accelerometer measurements may be flagged.

Other events may affect magnetometer readings. For example, proximity to a casing deteriorates magnetometer measurements as the surrounding magnetic field may be distorted. Likewise drilling operations in formation 106 that is susceptible to be magnetized deteriorates magnetometer measurements as the magnetized formation may distort the surrounding magnetic field. Additionally, drilling operations along the dip angle (Inclination≅90 degrees−Dip) reduces magnetometer measurements of oscillation amplitudes in the x and y directions. Drilling towards north, in the northern hemisphere (Azimuth≅0), also reduces magnetometer measurements of oscillation amplitudes in the x and y directions. Using true north/azimuth or magnetic north/azimuth may assess in determining this issue. Other related events that may affect one or more sensors 136 may be degraded and faulty accelerometers, magnetometers and gyros that may cause one or more sensor 136 to be unavailable. In block 408, event flags may be generated for all the above events based on high density data acquired during drilling operations.

In block 410, the events flags may be sent to personnel. In examples, event flags may be pulsed to the surface and logged into information handling system 138. Additionally, the events may be logged into information handling system 138 disposed on BHA 134. In block 412, each event flag may be reviewed by personnel, who may manually change between one or more sensors 136. In an example, event flags may be presented to personnel in an advisory mode that highlights one or more sensors 136 that personnel should choose for measurements. Additionally, information handling system 138 may process the event flags automatically and change between one or more sensors 136 without personnel input. In this example, if information handling system 138 is disposed downhole on BHA 134, event flags may be processed downhole and automatically selected sensors 136 may be communicated to personnel on the surface through and uplink/pulse communication.

Current technology for the RSS requires human interpretation of data taken from sensors on the RSS. Due to the experience of personnel, this may lead to incorrect and/or slow analysis from taken measurements. As described above, described methods and system may produce automated flags that warn personnel with recommendations on procedures to be taken. Additionally, the methods and systems may perform automated changes in a feedback loop based at least in part on sensors disposed on the RSS. This may remove the requirement for human interpretation of data to make decisions from measurements taken by sensors on the RSS. This not only reduces the reaction time upon a need to change the feedback source, but it also removes the human-induced variance in drilling performance due to sub-optimal selection of feedback sources. The systems and methods may include any of the various features of the systems and methods disclosed herein, including one or more of the following statements.

Statement 1: A method may comprise disposing a rotary steerable system (RSS) into a borehole. The rotary steerable system may comprise one or more sensors configured to take one or more measurements. The method may further comprise performing a tool position calculation from the one or more measurements and creating one or more event flags based at least in part on a location of the RSS in a formation, wherein the one or more event flags are created by an information handling system disposed on a bottom hole assembly. The method may also comprise selecting an algorithm for the tool position calculation based on the one or more event flags.

Statement 2. The method of statement 1, wherein the tool position calculation determines toolface, inclination, or azimuth.

Statement 3. The method of statements 1 or 2, wherein the one or more sensors comprises a plurality of sensors, and wherein the method further comprises selecting between the plurality based on the one or more event flags.

Statement 4. The method of statements 1-3, further comprising sending the one or more event flags from the information handling system to a second information handling system at surface to be viewed by personnel.

Statement 5. The method of statement 4, further comprising the personnel selecting at least one sensor from the one or more sensors for measurements to be used in the algorithm or the algorithm for the tool position calculation.

Statement 6. The method of statements 1-4, further comprising processing the one or more event flags with the information handling system.

Statement 7. The method of statement 6, further comprising the information handling system selecting at least one sensor from the one or more sensors for measurements to be used in the algorithm or the algorithm for the tool position calculation.

Statement 8. The method of statement 7, further comprising sending one or more selections to a second information handling system at surface to be viewed by personnel.

Statement 9. The method of statements 1-4 and 6, wherein the information handling system is disposed on the RSS.

Statement 10. The method of statements 1-4, 6, and 9, further comprising preparing a job plan that includes identifying one or more decision trees for algorithms, thresholds, or possible events experienced during drilling operations.

Statement 11. A system may comprise a rotary steerable system (RSS). The RSS may comprise one or more sensors configured to take one or more measurements. The system may further comprise an information handling system disposed on a bottom hole assembly and configured to perform a tool position calculations from the one or more measurements, create one or more event flags based at least in part on a location of the RSS in a formation, and select an algorithm for the tool position calculation based on the one or more event flags.

Statement 12. The system of statement 11, wherein the tool position calculation determines toolface, inclination, or azimuth.

Statement 13. The system of statements 11 or 12, wherein the one or more sensors comprises a plurality of sensors, and wherein the information handling system is further configured to select between the plurality based on the one or more event flags.

Statement 14. The system of statements 11-13, wherein the information handling system is further configured to send the one or more event flags from the information handling system to a second information handling system at surface to be viewed by personnel.

Statement 15. The system of statement 14, wherein the information handling system is further configured to select at least one sensor from the one or more sensors for measurements to be used in the algorithm or the algorithm for the tool position calculation.

Statement 16. The system of statements 11-14, wherein the information handling system is further configured to process the one or more event flags with the information handling system Statement 17. The system of statement 16, wherein the information handling system is further configured to select at least one sensor from the one or more sensors for measurements to be used in the algorithm or the algorithm for the tool position.

Statement 18. The system of statement 17, wherein the information handling system is further configured to send one or more selections to a second information handling system at surface to be viewed by personnel.

Statement 19. The system of statements 11-14 and 16, wherein the one or more sensors are a magnetometer, an accelerometer, or a gyro.

Statement 20. The system of statements 11-14, 16, or 19, the information handling system is further configured to prepare a job plan that includes identifying one or more decision trees for algorithms, thresholds, or possible events experienced during drilling operations.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below.

Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
disposing a rotary steerable system (RSS) into a borehole, wherein the rotary steerable system comprises:
one or more sensors configured to take one or more measurements; and producing a job plan for the RSS;
creating one or more event flags based at least in part on a comparison made between the job plan and the one or more measurements, wherein the one or more event flags represent a degradation of the one or more measurements based on environmental conditions or mechanical factors and are created by an information handling system disposed on a bottom hole assembly;
selecting with a decision tree an optimized algorithm for a tool position calculation from a plurality of algorithms based on the one or more event flags, wherein each algorithm from the plurality of algorithms comprises a different set of sensor types; and inputting at least the one or more measurements into the optimized algorithm to calculate tool position.

2. The method of claim 1, further comprising sending the one or more event flags from the information handling system to a second information handling system at surface to be viewed by personnel.

3. The method of claim 2, wherein selecting the algorithm for the tool position calculation further comprises the personnel manually changing the one or more sensors and the algorithm for the tool position calculation.

4. The method of claim 1, further comprising processing the one or more event flags with the information handling system.

5. The method of claim 4, wherein the information handling system automatically selects at least one flagged sensor from the one or more sensors.

6. The method of claim 5, further comprising sending one or more selections to a second information handling system at surface to be viewed by personnel.

7. The method of claim 1, wherein the information handling system is disposed on the RSS.

8. The method of claim 1, wherein the sensor types comprise a magnetometer, an accelerometer, and a gyro.

9. The method of claim 1, further comprising switching from a first feedback source to a second feedback source based on the one or more event flags, the second feedback source having a reduced signal-to-noise ratio relative to the first feedback source at a given tool position in the borehole.

10. The method of claim 9, wherein the switching is performed automatically by the information handling system.

11. The method of claim 1, wherein the selected algorithm consists essentially of a plurality of trigonometric functions.

12. The method of claim 1, wherein the calculated tool position comprises each of an azimuth calculation, a tool face calculation, and an inclination angle.

13. The method of claim 1, wherein the plurality of algorithms comprises a first algorithm relying only on accelerometers and a second algorithm relying on a combination of only accelerometers and magnetometers.

14. The method of claim 13, wherein the plurality of algorithms further comprises a third algorithm, wherein the third algorithm relies on a combination of only gyros and accelerometers.

15. A system comprising: a rotary steerable system (RSS) comprising:
one or more sensors configured to take one or more measurements; and an information handling system disposed on a bottom hole assembly and configured to:
produce a job plan for the RSS;
create one or more event flags based at least in part on a comparison made between the job plan and one or more measurements with a decision tree, wherein the one or more event flags represent a degradation of the one or more measurements based on environmental conditions or mechanical factors;
select with a decision tree an optimized algorithm for a tool position calculation from a plurality of algorithms based on the one or more event flags, wherein each algorithm from the plurality of algorithms comprises a different set of sensor types; and
input at least the one or more measurements into the optimized algorithm to calculate tool position.

16. The system of claim 15, wherein the information handling system is further configured to send the one or more event flags from the information handling system to a second information handling system at surface to be viewed by personnel.

17. The system of claim 15, wherein the information handling system is further configured to process the one or more event flags with the information handling system.

18. The system of claim 15, wherein the information handling system is further configured to send one or more selections to a second information handling system at surface to be viewed by personnel.

19. The system of claim 15, wherein the sensor types comprise a magnetometer, an accelerometer, and a gyro.

20. The system of claim 15, wherein the information handling system is further configured to continuously update the job plan.

* * * * *